United States Patent [19]
Mertens

[11] 3,802,737
[45] Apr. 9, 1974

[54] SAFETY SEAT, PARTICULARLY FOR AUTOMOTIVE VEHICLES

[75] Inventor: Wolfgang Mertens, Karlsruhe, Germany

[73] Assignee: Kurt Heizer, Karlsruhe, Germany

[22] Filed: July 7, 1972

[21] Appl. No.: 269,881

[52] U.S. Cl................ 297/216, 297/384, 297/390, 280/150 SB
[51] Int. Cl.......... A47c 7/02, B60r 2/06, B60n 1/02
[58] Field of Search .......... 297/216, 384, 385, 396, 297/397, 410; 296/65, 110–113; 280/150 SB; 188/1

[56] References Cited
UNITED STATES PATENTS

| | | | |
|---|---|---|---|
| 3,186,760 | 6/1965 | Lohr et al. | 297/385 X |
| 3,198,288 | 8/1965 | Presunka | 297/386 X |
| 3,420,572 | 1/1969 | Bisland | 297/386 |
| 3,545,789 | 12/1970 | Graham | 280/150 SB |
| 3,561,819 | 2/1971 | Renneker | 297/386 |

*Primary Examiner*—Casmir A. Nunberg
*Attorney, Agent, or Firm*—Edwin E. Greigg

[57] ABSTRACT

There is described a safety seat supported in its entirety by a frame formed of members deformable under impact. The length adjusting means for the seat as well as the adjusting means for the headrest also include deformable elements. There is further provided a backup means which supports the backrest cushion and which is connected to the backrest frame by deformable elements. The backup means also supports the adjustable headrest which includes a buckling cover and torsion members for a limited rearward rotation.

12 Claims, 38 Drawing Figures

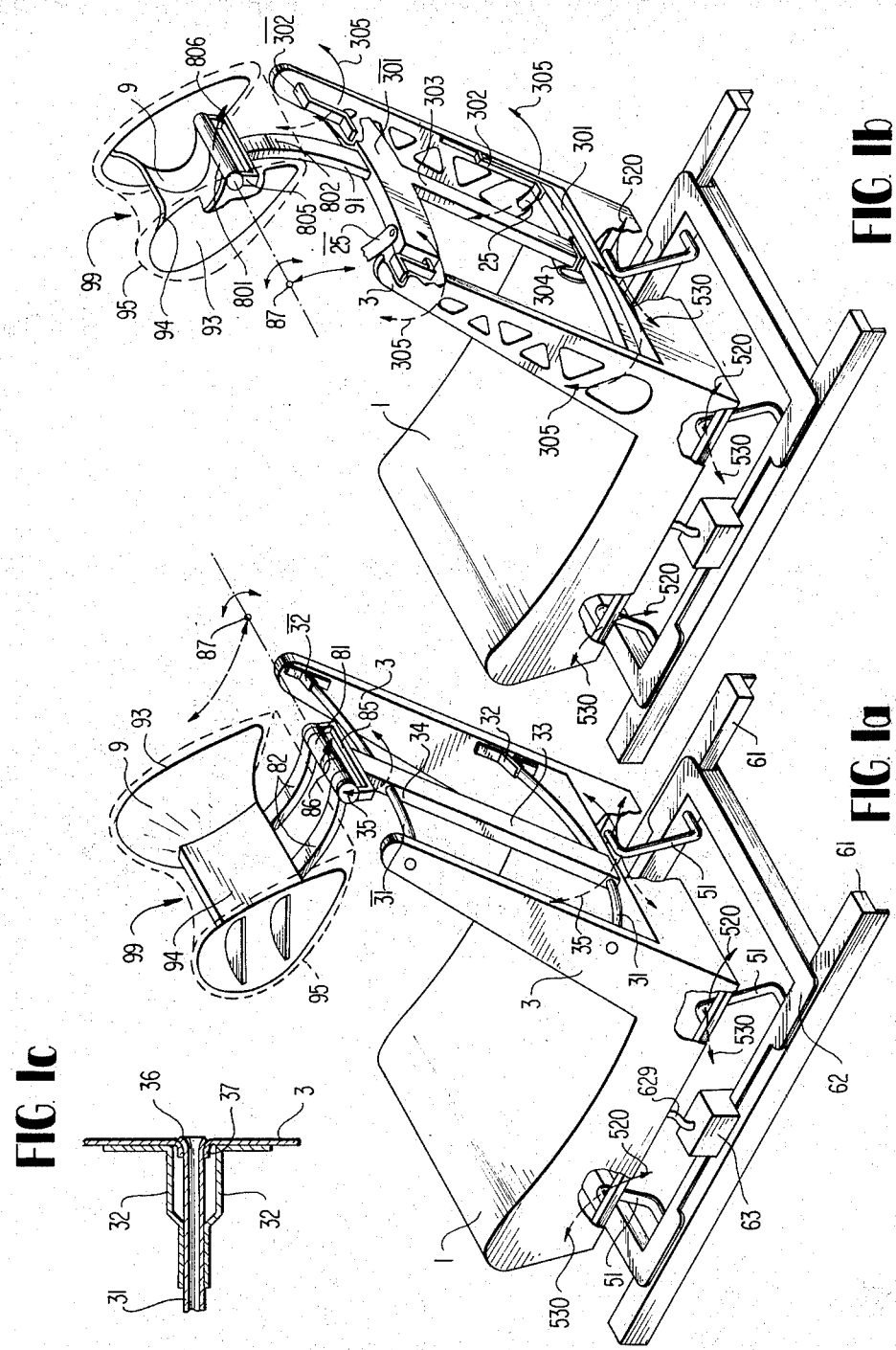

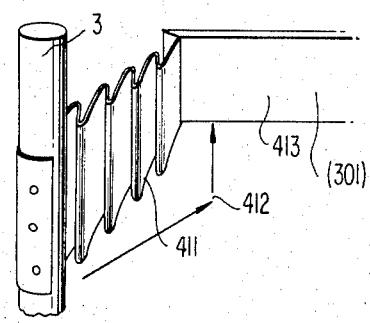
FIG. 4a
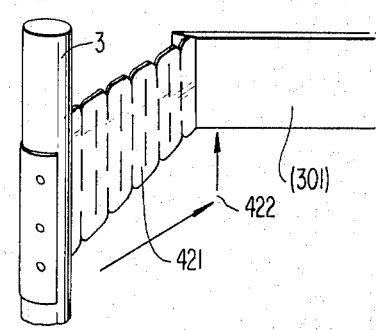
FIG. 4b
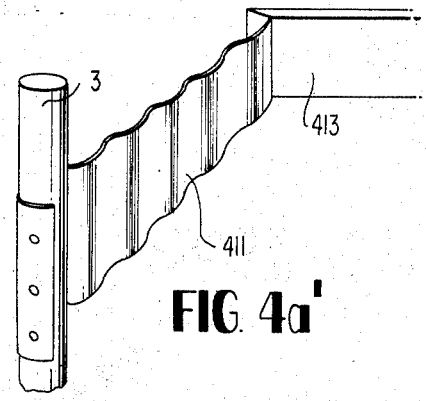
FIG. 4a'
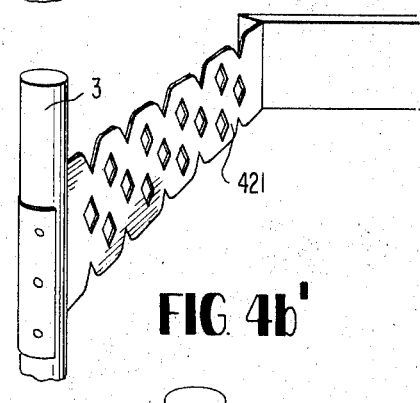
FIG. 4b'
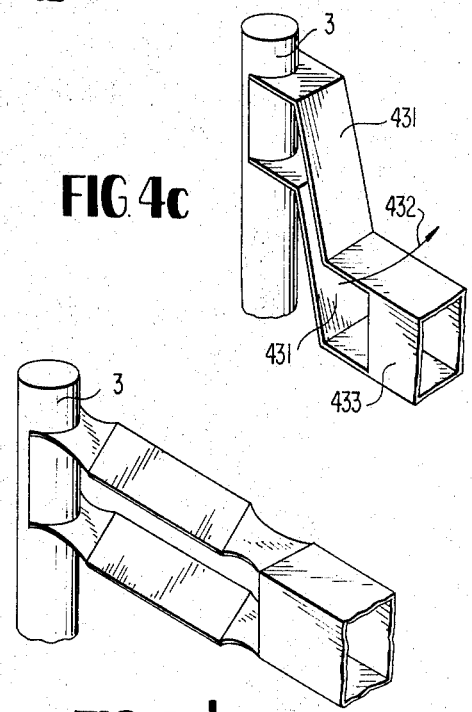
FIG. 4c
FIG. 4c'
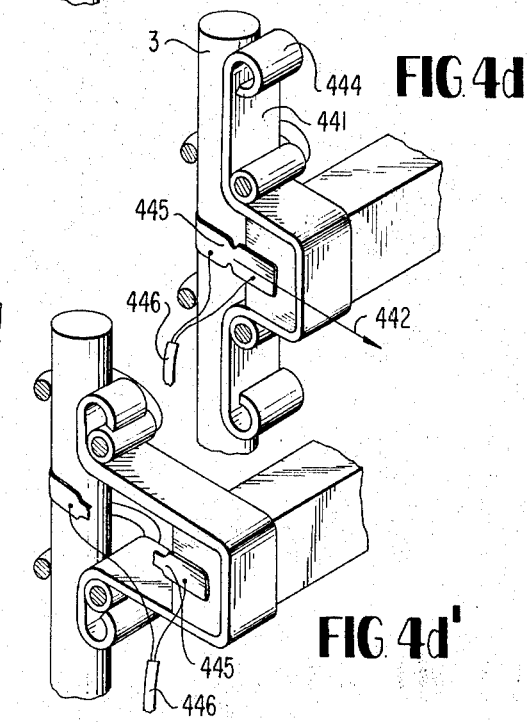
FIG. 4d
FIG. 4d'

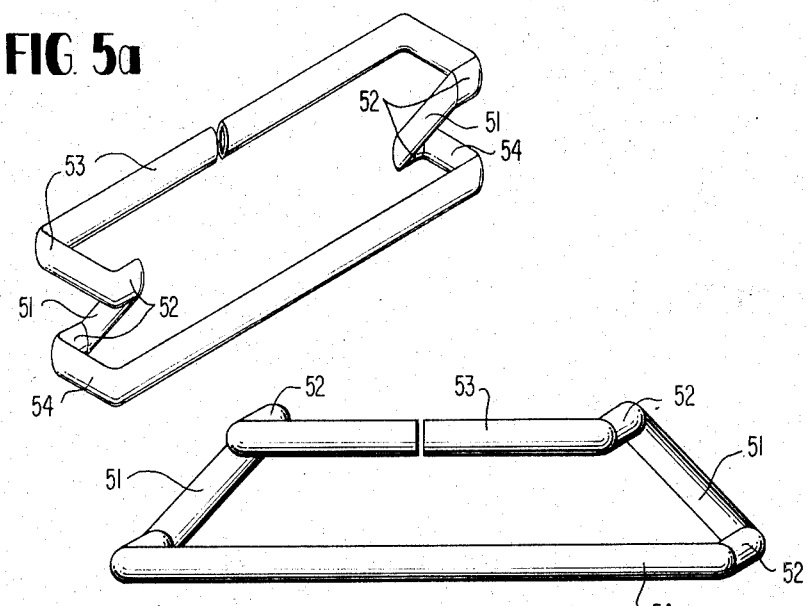
FIG. 5a
FIG. 5b
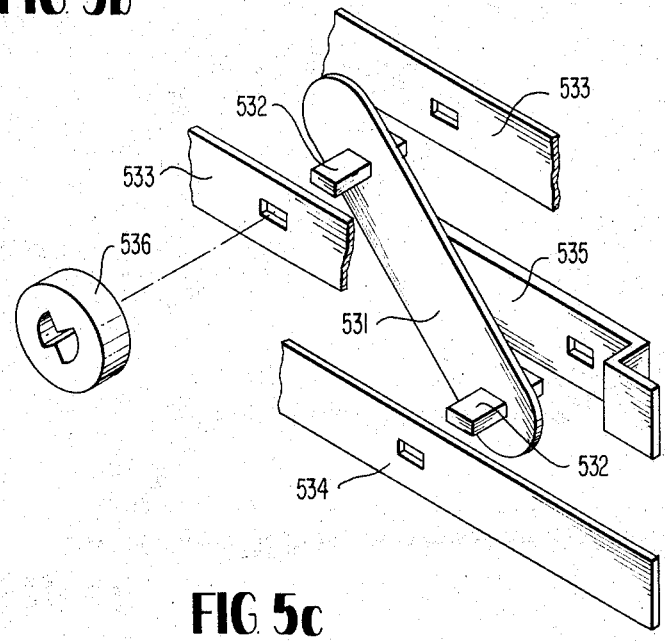
FIG. 5c

FIG.9c'
FIG.9c
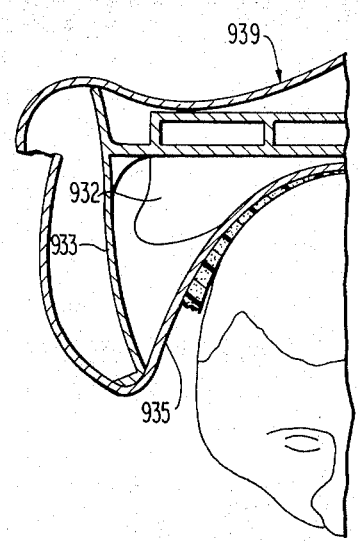
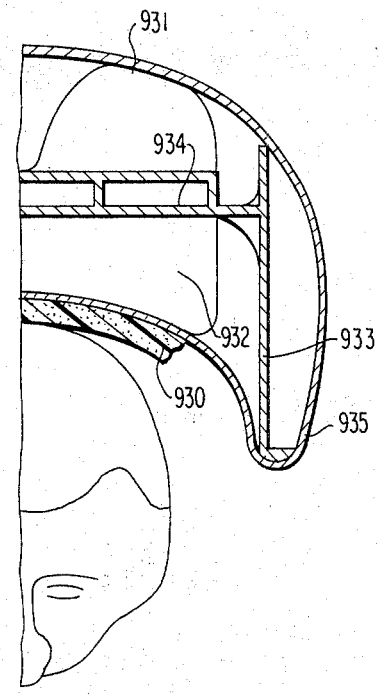
FIG.9d

SAFETY SEAT, PARTICULARLY FOR AUTOMOTIVE VEHICLES

BACKGROUND OF THE INVENTION

This invention relates to a system of deforming elements mounted in a predetermined, cooperating manner on the base structure of vehicle seats. The purpose of the system is to achieve a predetermined displacement of the occupant's head and body in case of accident-caused impacts, particularly rear-end collisions. The said predetermined displacement of the occupant is so designed that the acceleration of head and body is optimally limited while optimally utilizing the available space in the vehicle without additionally endangering the safety of the occupants. It is a desideratum that the components of the system be relatively simple to manufacture and the weight of the entire arrangement be maintained at a low value by means of expediently designing the structural configuration of the individual elements.

The principle of energy absorption by deformation, as well as its utilization during accident-caused impacts by means of collapsible zones or particular energy dissipating members, has been known for a long time. It has also been suggested in a very general sense to utilize this principle in vehicle seats. The more detailed proposals in this field, however, involved expensive structures, a great plurality of components and expensive machining work. Other proposals involved a pivotal motion of the backrest about a lower turning point. The advantages of this solution, however, are counteracted by the harmful tendency of the occupant's body to be lifted upwards in the seat as a result of accident-caused impacts.

It has also been proposed to cause a pivotal movement of the seat for changing the force components to thus aid in restraining the occupant's body. For this purpose a simple unlatching without energy take-up has been proposed resulting in a rearwardly lowering motion. Such motion, however, endangers the legs of the occupants in the rear seat. Or, the aforenoted pivotal movement of the seat may be achieved by expensive joint and glide arrangements in which, however, the freedom of play and the take-up of lateral impacts create additional problems. There has further been suggested an energy absorbing seat shift utilizing a displacement effect and an expanding effect; these solutions, however, in addition to the seat adjustment, require high additional costs. A further known suggestion concerning a deforming member below the head component of a headrest provides a predetermined buckling point. In such an arrangement, however, the danger of breakage in case of over-load is great and there is no measure provided that would limit buckling.

The necessary continuously increasing requirements concerning injury-free impact speeds have led to increasingly rigid and robust seat structures with inherent disadvantages as to weight and cost. The energy-dissipating deforming elements which have been proposed thus far for controlling the acceleration transmitted to the occupant's body by the vehicle seat have been expensive and have not sufficiently taken into consideration the space available for the displacement of the seat without additionally endangering the safety of the co-occupants. Furthermore, the assignee has found, during the course of research conducted within its facilities and by public research institutes, that headrest assemblies suggested thus far, due to their connection with the backrest, first swing away from the occupant's head under the impact pressure of the occupant's back. Thus, the acceleration of the occupant's head occurs with a delay. The inherent disadvantage is that during this delay transversal forces are exerted on the vertebral column and that a jarring blow is delivered to the occupant's head at the final impact thereof against the headrest arrangement. The undesired result, which the present invention seeks to avoid, is a significant acceleration surge.

OBJECT OF THE INVENTION

For the foregoing reasons the invention seeks to control, in a predetermined manner, the magnitude and the timely course of the acceleration imparted on the human torso and head by accident-caused impacts.

A critical factor here is the take-up of the inertia forces imparted by the back of the occupant to the backrest cushion which, under the effect of these forces, has to yield, in the first place, rearwardly, and in the second place, upwardly in an energy-consuming manner to an extent which is greater at its lower end than at its upper end. In this manner the proven tendency of the body to be lifted off the seat is decreased and, at the same time, the seat follows the residual upward lift of the body and swings the headrest assembly secured thereto actively in a forward direction into firm engagement with the occupant's head for ensuring an effective position at the earliest possible moment. The impact of the head against the headrest is dampened by virtue of a buckling headrest cover which compensates for the varying distances between the occupant's head and the preset headrest cover and decreases, by means of lowering the acceleration of torso and head, the forces to be taken up by the backrest frame. Consequently, the latter may be of weaker and lighter structure.

In case of a low vehicle seat (arranged so for lowering the center of gravity and for reducing air resistance), an outward pivotal motion of the backrest would normally endanger the knees of the passengers in the back seat. For this reason the invention additionally provides an energy-consuming trapezoidal torsion bar assembly constituting a seat carrying frame. Upon impact from the rear, this seat carrying frame causes the rear edge of the seat and the lower edge of the backrest cushion to be lifted over the knee zone of the passengers in the rear seat and, at the same time, further reduces the acceleration imparted on the occupant's body.

Further, as an arresting element for the seat length adjusting assembly there is provided an energy-dissipating deforming member, the deformation characteristics of which are expediently selected in such a manner that it takes up force and acceleration surges which are caused by particularly serious collisions and which would overcome the structurally predetermined strength and rigidity of the backrest. At the same time, such an arrangement is advantageous in that the deforming components serving as a backup support for the backrest cushion and the seat frame can be designed for optimal efficiency even in case of collisions of medium force and, as a result, the occupant is particularly protected from accelerations.

Any of the deforming elements proposed by the invention as well as the aforenoted buckling cover of the headrest assembly may be used for the actuation of switches or sensors of known type which, themselves, do not form part of the invention. Such an arrangement has particular advantages in chain collisions where the vehicle is exposed to a series of impacts. Or, the aforenoted sensors or switches may be used to activate fire preventing means.

SUMMARY AND ADVANTAGES OF THE INVENTION

The seat incorporating the invention includes a backrest having a conventional rigid frame formed of a section bar, tube or lattice structure. The backrest is connected conventionally in a rigid or jointed manner with the seat proper. To the frame there is secured, by means of deforming elements, a backup support for the backrest cushion. According to the invention, the backup support may be a simple or double cross-shaped section bar structure, or a sandwich-type structure made of plates and a hard foam body. It is also possible to form the backup support as a plate with appropriate stiffening means such as ribs or shaped edges.

The deforming members associated with the backup support are formed, according to a preferred embodiment of the invention, as torsion bars whereby the lower member or members have a larger lever length than the upper members. The larger lever arm, in cooperation with the momentum of the occupant's legs, effects a lead in time of the lower deflection, resulting in an early oblique positioning of the backup support for the backrest cushion and a movement of the headrest assembly (connected to said backup support) in a forward direction towards the head of the occupant. The aforenoted torsion bar assembly has the advantage that it may limit the extent of displacement to the fully stretched position of the torsion bars. The torsion bar assembly is designed in such a manner that there is obtained a favorable deformation characteristic with a very large safety margin against breakage in case of overloading. The same effect may be achieved by deforming members of different structure, as it will be discussed in the detailed description. If the invention is applied to the back seats of the vehicle, the deforming members are expediently directly secured to the transversal beams of the vehicle body which ensure the form stability of the passenger compartment when the trunk wall collapses.

To the aforeoutlined backup support for the backrest cushion there is secured a headrest assembly of known structure, but preferably of the type which has means for height adjustment and arrestable pivotal adjustment in the forward direction towards the occupant's head. According to the invention, the headrest cushion of the headrest assembly is formed as an energy absorbing buckling cover which, upon complete compression, engages a rigid inner carrier structure directly or through an intermediate damping cushion known by itself. The buckling cover, at the same time, forms lateral ears for preventing the head of the occupant to slide off as a result of oblique impact forces. An arrangement of the carrier structure in approximately the central plane of the buckling cover makes it possible that the rear half of the cover may serve for absorbing the impact by rear seat occupants and thus prevents the latter from being injured by the height adjusting mechanism. According to the invention, the pivotal arresting means is, for limiting its backward rotation, connected by a torsional deforming member with the height adjusting mechanism.

The seat frame or seat body is connected with the seat adjusting mechanism by means of trapezoidally arranged bars which, together with their terminal joints at the seat and adjusting mechanism, are formed as torsional bars. They limit the impact-caused seat displacement by virtue of the deformation of that bar which is opposed to the end exposed to the impact. The trapezoidal bar assembly tilts the seat in a manner known by itself as a function of the direction of impact for the purpose of better restraining the body of the occupant. According to the invention, the impact-caused displacement as controlled by the trapezoidal bar assembly adapts itself within limits to the direction of impact and is thus also effective against oblique shocks. The length and the position of the torsion bars are to be selected dependent upon the available inner space of the vehicle.

The invention will be better understood, as well as further objects and advantages will become more apparent, from the ensuing detailed specification of several exemplary embodiments taken in conjunction with the drawing.

BRIEF DESCRIPTION OF THE DRAWING

FIG. 1a is a perspective view of an embodiment of the entire vehicle seat according to the invention (the cushions and upholstery of the backrest and headrest are omitted for clarity);

FIG. 1b is a perspective view similar to FIG. 1, illustrating another embodiment of the invention;

FIG. 1c is a longitudinal sectional view of the torsion members at the backup support for the backrest cushion shown on an enlarged scale with respect to the illustration of FIG. 1a;

FIGS. 4a, 4b, 4c and 4d 4a', 4b', 4c' and 4d' are perspective illustrations of a first, second, third and fourth type of deforming members before deformation (upper illustration in each figure) and after deformation (lower illustration in each figure) and preferably used for connecting the backup support of the backrest cushion with the backrest frame;

FIG. 5a is a schematic perspective view of the front half of a seat carrier frame formed as a continuous tubular frame with integrated torsion bars;

FIG. 5b is similar to FIG. 5a, but showing the carrier frame as a lateral half;

FIG. 5c is a schematic perspective exploded view of a third type of torsion bar assembly;

FIG. 6a is a perspective view of a cut-off portion of a lateral guide rail with notches for receiving detent elements according to the invention;

FIG. 6b is a fragmentary perspective illustration of a sliding member affixed to the vehicle seat and associated with a first type of deformable detent element;

FIG. 6c is a perspective view of the detent element of FIG. 6b in a deformed condition;

FIG. 6d is a perspective view of a second type of detent member;

FIG. 6e is a perspective view of the detent member shown in FIG. 6d in a deformed condition;

FIG. 7a is a perspective fragmentary view of the third type of seat length adjusting means;

FIG. 7b is a schematic cross-sectional view of a column of compression discs with a first type of actuating mechanism shown in a locking position;

FIG. 7c is a view similar to 7b showing a second type of actuating mechanism in a released condition for permitting longitudinal seat adjustment;

FIG. 7d illustrates the overlap of the detent discs;

FIG. 8b is a diagram illustrating the deformation characteristic of an adjusting means shown in FIG. 8a;

FIG. 9c 9c' is a sectional top plan view of a headrest cushion with a buckling cover illustrated in a non-deformed (right-hand side) and in a deformed (left-hand side) condition; and FIG. 9d is a sectional side elevational view in the direction of the vehicle length of an internal support which fills the buckling cover and which supports the headrest cushion.

DESCRIPTION OF THE EMBODIMENTS

Turning now to FIGS. 1a and 1b there are shown two different embodiments of a vehicle safety seat assembly. The basic elements of the two assemblies may be combined with one another at will. Non-recognizable details of some components in FIGS. 1a and 1b are illustrated in other figures.

Figure 6B:
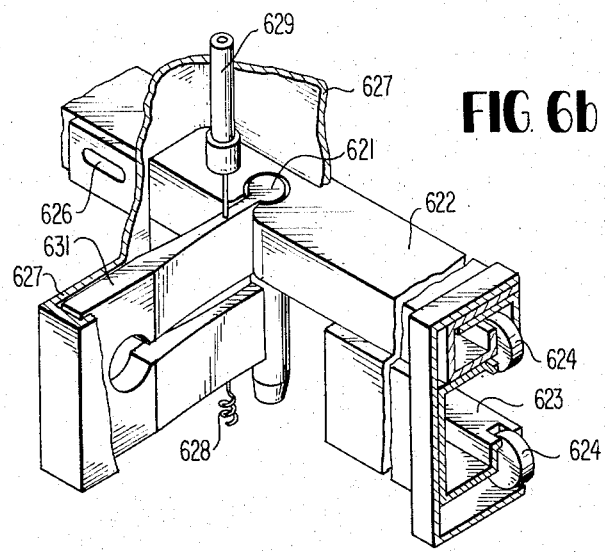
FIGS. 6a – 6e are perspective illustrations of parts of seat length adjusting mechanisms (including two types of deformable detent elements), namely.
Figure 6C:
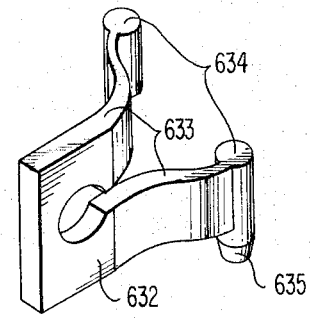
Figure 6D:
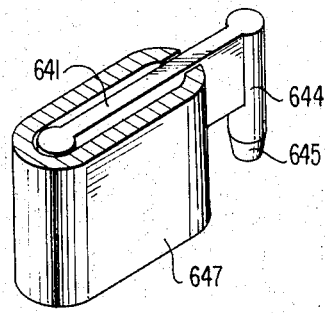
Figure 7B:
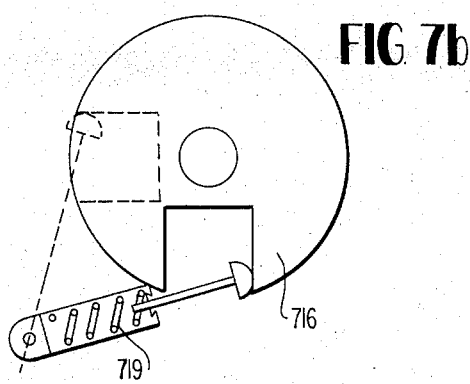
FIGS. 7a–7d illustrate a third type of longitudinal seat adjusting means with compressible elements, namely.
Figure 7C:
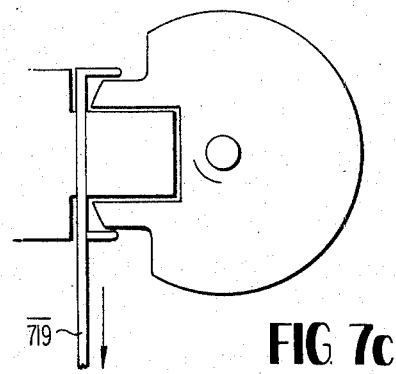
Figure 7D:
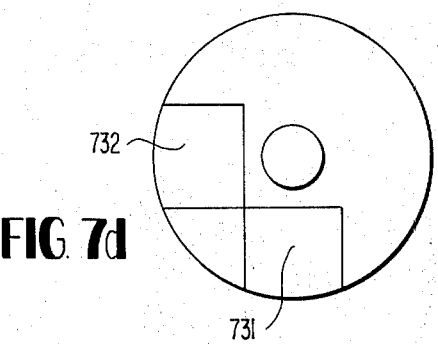
Figure 7A:
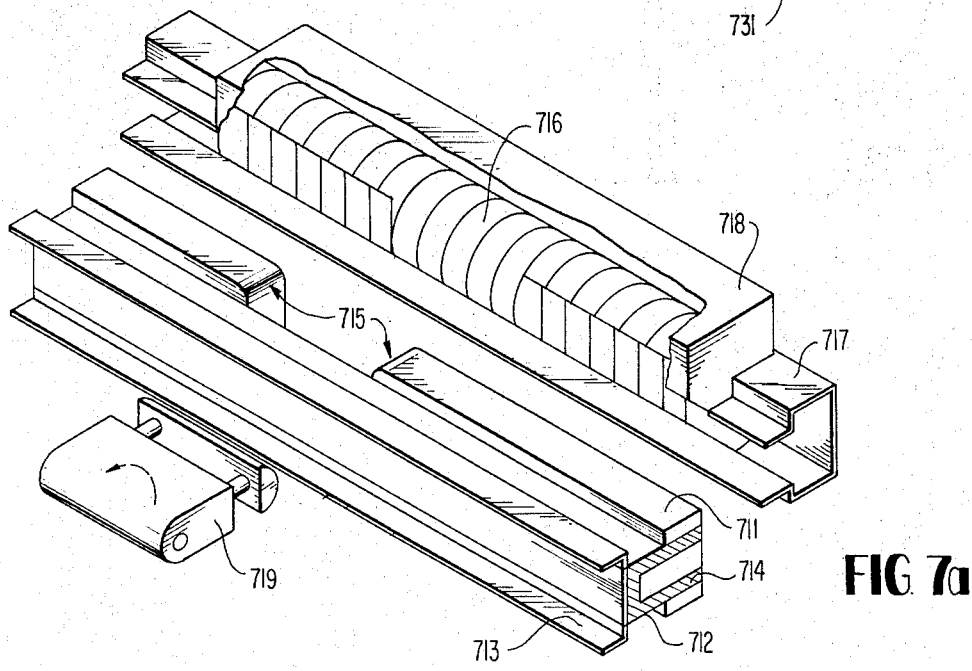

On the floor of the vehicle there are disposed parallel guide rails 61, one of which is laterally secured to the door threshold of the vehicle while the other is attached, for example, to the cardan hump or its reinforcing means. On the guide rails 61 there are glidably disposed sliding rails 62 which carry housings 63 for the deformable detent elements 631 (FIG. 6b), 641 (FIG. 6d) or 716 (FIGS. 7a and 7b).

Figure 6E:
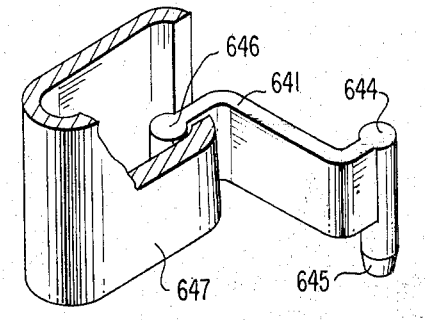
Figure 6A:
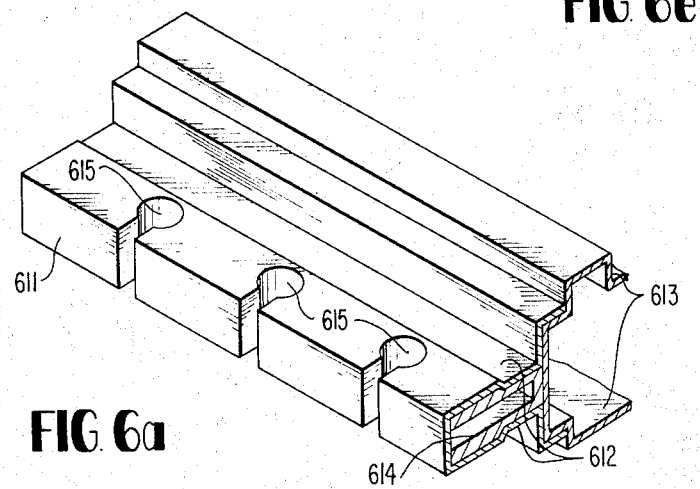

Turning now to FIG. 6a, there is shown a section of a shaped guide rail 611 with the track faces 612 proper that are provided with longitudinally extending elevated border means. The track face of the other, parallel guide rail preferably has no elevated lateral borders to compensate for the tolerances during the assembly of the floor group. The guide rail 612 is affixed, together with a reinforcing shaped insert 614, to a vehicle door threshold 613 which thus takes up the large forces generated at the detent openings 615 at the moment of impact.

In FIG. 6b there is shown an embodiment of a sliding rail which includes a detent rail 622 carrying the counter detents 621 (one for each deformable detent element 631), the shaped sliding faces 623 which, similarly to the guide rails 612, may be provided either with a friction-reducing insert made of a synthetic material (such as PA, or PETP), or with glide rollers 624. At 625 there are indicated terminal reinforcements at the sliding faces for taking up large tilting forces. The detent rail 622 carries guide housing 627 (shown broken away) which is displaceably secured to the detent rail 622 as indicated by the longitudinal slot 626. The housing 627 serves for receiving the deformable detent element 631 which is maintained in its locking position by means of a spring 628. The lower wing of the element 631 extends, with its shaped pin 635 into a detent 615 of the guide rail 611 (FIG. 6a). For the release of the detent mechanism by means of complete withdrawal into the counter detent 621 there may serve, for example, a Bowden cable 629.

The detent element 631 illustrated in FIG. 6b is an expandable member which is shown in FIG. 6c after deformation. The base body 632 of the detent element 631 carries the expanding wings 633 with the detent lugs 634 and the conical positioning pin 635 which facilitates engagement.

In FIG. 6d there is shown a deformable detent element 641 constituting another embodiment. The latter is guided in a housing 647 (shown broken away for clarity) which has to be dimensioned for the full takeup of forces. The housing 647 may be connected by spacer supports (not shown) directly with the sliding rail 623; its activation may be effected as illustrated in FIG. 6b. In this second embodiment, too, the detent lug 644 extends into the notch 615 of the guide rail 611; a detent rail (such as 622 in FIG. 6b) is not required here. In FIG. 6d the bending element 641 is shown in its upper released position, whereas in FIG. 6e it is shown in its deformed condition in its lower locking position. The detent lugs (634, 644) and the counter lug 646 may have any desired configuration different from that shown in the figures.

FIG. 7a illustrates a further type of energy absorbing detent means. In this embodiment there is shown the guide rail 711 having a track 712 and reinforcing rails 714 affixed to the door threshold member 713. Into the detent notch 715 there extends a structurally predetermined number of compressible discs 716 which are made of a material (preferably a synthetic material) yielding plastically beyond a predetermined pressure. The compressible discs 716 are stacked on a shaft (not shown) within the sliding rail 717 between the abutments 718 which take up impact forces. The upper edge of an actuating means 719, substantially of the length of the detent notch 715, is, in its adjusting position, flush with the upper edge of the sliding rail 711 for ensuring a smooth passage of the compressible laminae 716 over the detent slot 715. For locking the detent means, the actuating means 719 is pivoted downwardly and thus swings the discs 716 situated above the detent notch 715 downward into an engaging position aided by the skewed or rounded edges of the detent slot 715. The actuating means 719 may be controlled, in a non-illustrated and simple manner, by the vehicle door, so that a seat adjustment is possible only while the door is open and thus cannot be performed when the vehicle is in motion. FIGS. 7b and 7c show the position of components during adjustment and during locking, whereas FIG. 7d shows the overlap between the discs 731 which are in an engaging position and the discs 732 which are situated laterally of the detent slot 715. Instead of a circular shape the discs may have any other desired configuration. It is to be understood that the guide rails 611 and 711 also may be provided with terminal abutments.

The components designated at 51 in FIGS. 1a and 1b constitute the torsion bar assembly forming the carrier frame for the vehicle seat 1. The arrows 520 drawn in solid lines indicate the direction of shift in case of an impact from the rear, whereas the arrows 530 drawn in broken lines indicate the direction of displacement in case of an impact from the front. The latter movement, however, is fully effective only if the body restraining devices, such as seat belts, are directly connected with the vehicle seat. Exemplary embodiments for the torsion bar assemblies are shown in FIGS. 5a, 5b and 5c. In FIGS. 5a and 5b there are shown two embodiments of these torsion bars formed by continuous bent tubular frames of desired sectional shape. The torsion bars 51 continue directly in the effective torsion lengths 52, whereas the frame portions 53 serve for connecting the carrier frame with the vehicle seat 1 and the frame components 54 serve for connecting the carrier frame with the sliding rails 62 (622, 717). The torsion or deforming portions 52 may have a cross section (for example, oval) which is different from the remainder of the continuous tubular frame and which is obtained as a result of a subsequent mechanical treatment. These elements yield also to transversal and oblique impacting forces approximately in the direction of the force. In case means for an angular adjustment of the seat is provided, it should expediently be located above the seat frame.

FIG. 5c illustrates another embodiment of a torsion bar 531 having deforming portions 532 of expedient shape. The apertured support strips 533 for the torsion bar 531 are affixed to the vehicle seat or themselves form the frame therefor. The support strips may have any desired sectional shape. The strip 534 is a part of the sliding rails 62 (622, 717), or is attached thereto for cooperation with the strip 535. The torsion limiting means 536 is inserted on the torsion elements 532 and, dependent upon its thickness, limits to a greater or lesser extent the torsional deformation. Or, it may be so designed as to have an impeding effect on the torsional motion beyond a certain limit, thus altering the torsion characteristics. This embodiment of the torsion member may also find application in other locations determined by the invention.

In FIG. 1a the shaped backrest frame is indicated at 3. Its configuration, as well as means for its securing and angular positioning do not form part of this invention; they may have any desired shape and structure.

To the backrest frame 3 there are secured transversal tubular rods 31, 31 which are arcuately bent downwardly in the direction of inclination of the backrest. The rods 31, 31 are affixed to the backrest frame 3 with the interposition of respective torsion members 32, 32. According to the invention, in order to achieve the impact-caused desired displacement of the backrest, the lower arcuate transversal tubular bar 31 has a smaller radius of curvature than the upper curved tubular bar 31. The shape of the torsion members 32 (32) is shown in section in FIG. 1c. The outwardly bent terminus 36 of the bar 31 is freely rotatably received by an opening 37 which is provided in the backrest frame 3 and which has an inwardly turned circular edge. The torsion forces are taken up by the deforming members 32.

The connecting post 33 carrying the headrest assembly 9 is coupled with the upper transversal bar 31 through a longitudinal slot 34 in order to permit a full displacement of the headrest assembly 9 with the bar 31 with respect to the bar 31. The deflecting motion of this arrangement during impact is shown by arrows 35.

The precedingly described effect is also achieved by two embodiments shown in a combined manner in FIG. 1b. If the transversal bar 301 is fixedly secured to the lattice-type backrest frame 3 (in which case the bar 301 has to be somewhat lower than shown), then the vertical bar 303 is attached to the transversal bar 301 through a stretchable deforming member 304. If, on the other hand, the vertical connecting post is fixedly attached to the transversal bar 301, then the latter is affixed to the backrest frame 3 with the interposition of deforming members such as torsion bar 302 or components such as illustrated in FIGS. 4a–4d. The upper transversal bar 301 is, in either case, connected with the backrest frame 3 through the deforming members 302 or through deforming members according to FIGS. 4a–4d and is fixedly connected with the transversal bar 303. The latter receives the height adjustment post 91 of a known type which supports the headrest assembly 9. Arrows 305 indicate the course of impact-caused deformation of this arrangement.

Figure 3B:
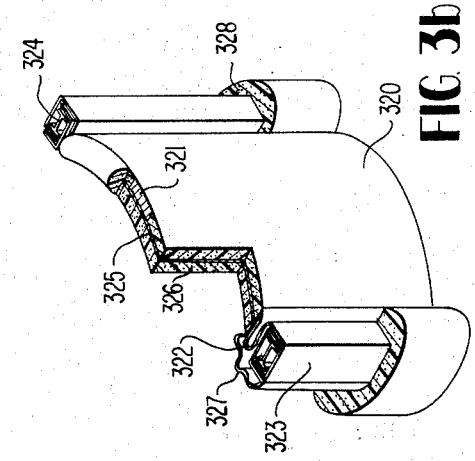
FIG. 3b is a perspective, cutout view from the rear of a sandwich element constituting a backup support for the backrest cushion and including laterally arranged insertable plates forming integrated deforming members.
Figure 3A:
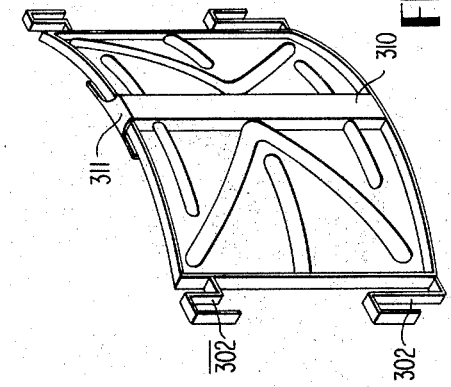
FIG. 3a is a perspective view from the rear of a shaped plate constituting a backup support for the backrest cushion.

This backwardly swinging backup structure for supporting the backrest cushion may also be formed as a shaped plate, such as shown in FIG. 3a and may be combined with any of the above-described deforming members. In the drawing, at 311, there is shown the integrated guiding means for the height adjusting post (such as 811 in FIG. 8a) of a headrest assembly 9. Instead of a shaped plate as illustrated in FIG. 3a, a sandwich structure may be used as shown in FIG. 3b. In the latter, the backplate 321 is integrated with the backrest frame 323 through a stretchable deforming member 322 and includes an additional stiffening means 324. A second plate 325 forms with the foam material filling 326 the sandwich structure and is connected with the backrest frame 323 by means of a stretchable deforming member 327. The backrest frame 323 may be surrounded by a foam material (328) for improving the lateral guidance and also for cushioning against impact-caused injuries. It is to be understood that the rear side of the plate 321 may also be covered with a foam material.

FIGS. 4a–4d are complementary as they show additional deforming members; the backrest frame 3, for the sake of simplicity, is shown as a tubular frame. In each of these figures there is shown a deformable member before (upper illustration) and after (lower illustration) deformation. In FIG. 4a the wavy stretchable deforming member 411 known by itself is, according to the invention, arranged at an angle with respect to the effective direction and extends rearwardly and upwardly (as indicated by arrows 412) and has a progressive characteristic by virtue of its wedge-shaped blank material and also, by virtue of an increasing amplitude of its wave configuration. At 301 there is indicated the transversal bar of the backup support for the backrest cushion.

FIG. 4b shows a stretchable deforming member 421 similar to the member 411 of FIG. 4a except that the former bends in the plane of stretch, whereas the latter bends normal to the direction of stretch. The arrows indicating the orientation of the member 421 are designated at 422.

In FIG. 4c there is shown a dual torsion member 431; its effective arcuate path of deformation is indicated with the arrow 432. This arrangement has the advantage that the backup means 433 for the backrest cushion is displaced parallel to itself.

The arrangement according to FIG. 4d maintains a constant deformation characteristic by virtue of contacting continuously new portions of the deforming member 441. The effective direction of deformation as indicated by the arrow 442 may be altered according to the invention by a combination with arcuately or obliquely deforming members, or by a greater strength of material in the upper half of the deforming strip. The terminal bent portions 444 limit the extent of motion during deformation. The assembly may be provided with a breakable contact 445 including associated conductors 446.

Turning once again to FIGS. 1a, 1b, by anchoring the body restraining devices (such as seat belts) 25, 2̄5̄ directly to the backup means 3̄1̄, 301, 310 and 320 for the backrest cushion, these devices utilize the deformations of the deforming elements and consequently, they may be of more rigid structure.

Figure 8A:
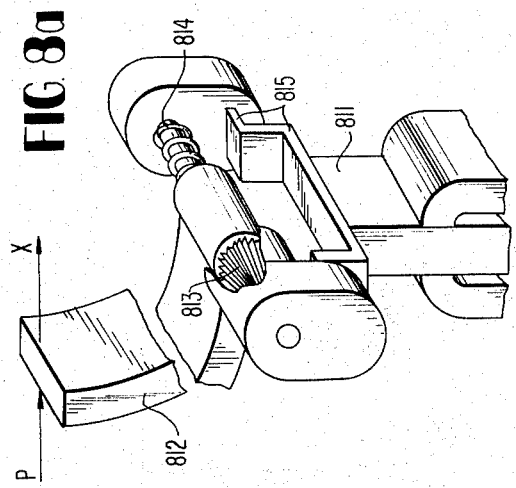
FIG. 8a is a fragmentary perspective view of a pivotal headrest adjusting means incorporating a torsional deforming member according to the invention and shown clamped in a test stand for measuring the deformation characteristics.
Figure 8B:
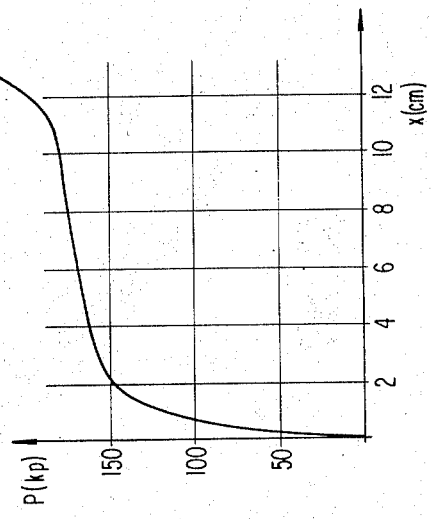

The headrest assembly 9 according to FIG. 1a comprises a pivoting mechanism 81 which is embedded in the backrest cushion and is protected thereby. The pivoting mechanism 81 has dual radial adjusting posts 82 which are expediently supported by dual conical gear detents 813 (FIG. 8a) releasable by pressing the posts 82 towards one another. FIG. 8a shows a sole adjusting post 812 associated with a conical teethed detent 813 cooperating with a hollow conical teethed recess. The detent 813 is released by lateral displacement against the force of a spring 814. This pivoting detent mechanism is provided with a torsion member 85, 805, 815, the favorable characteristic of which is shown in FIG. 8b as a result of tests with the arrangement shown in FIG. 8a.

Figure 9A:
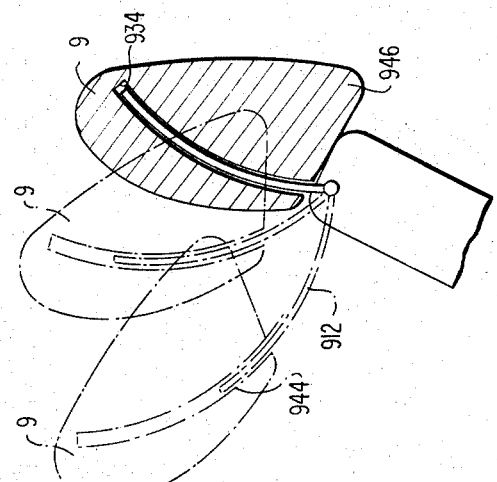
FIG. 9a is a fragmentary schematic side elevational view of a headrest illustrated in different angular positions during its impact-caused displacement.
Figure 9B:
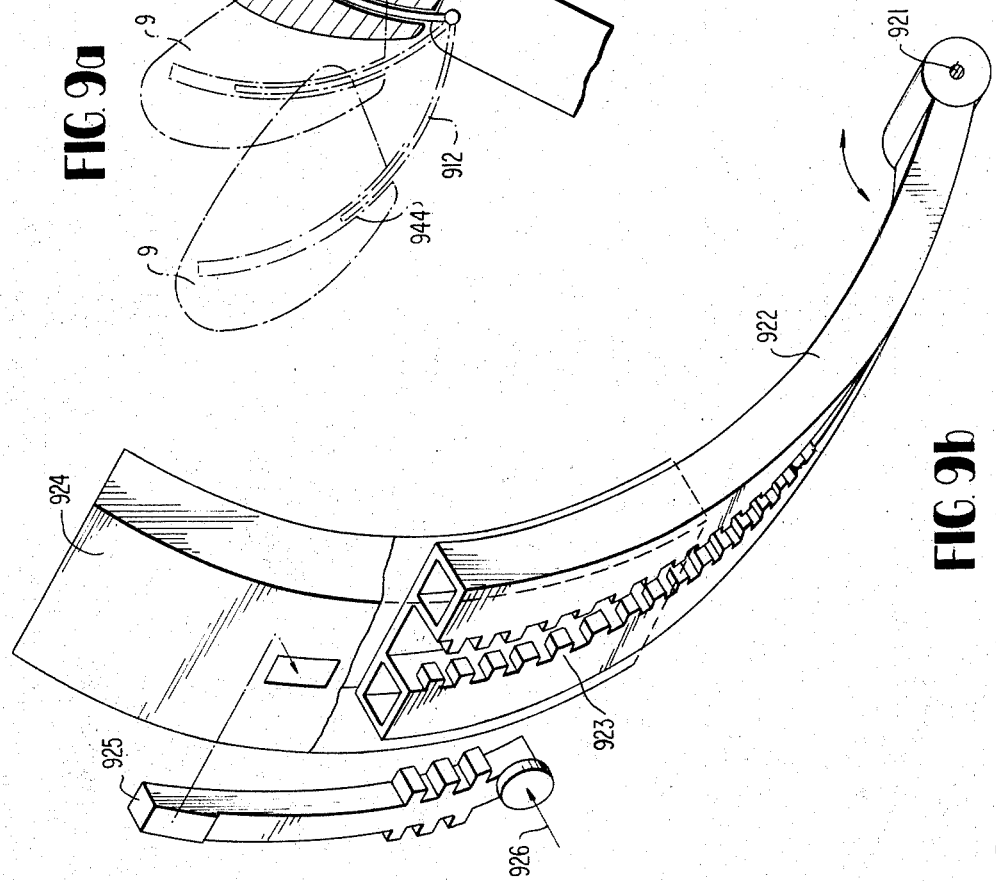
FIG. 9b is a perspective view of an arcuate telescoping support post with its detent mechanism associated with a headrest.

It has been found to be particularly advantageous to combine the pivotal detent (indicated at 81 in FIG. 1a and at 813, 814 in FIG. 8a) disposed in the upper edge portion of the backrest with the arcuate radial adjusting means 82 (FIG. 1a), 812 (FIG. 8a), 912 (FIG. 9a) and 922 (FIG. 9b). It is seen in FIG. 9a which illustrates the course of displacement of the headrest as a result of an impact, that substantially independently from the adjusted position, the engagement of the occupant's head and the back of his neck with the headrest occurs over a large area. In FIG. 9b there is shown an exemplary embodiment of the detent 923. At 922 there is indicated the curved radial post with its pivot 921. The curved tunnel member 924 formed as portion of the headrest cushion supporting means, carries the detent spring 925 with the actuating button 926.

An advantageous embodiment of the aforenoted headrest cushion supporting means is illustrated in FIG. 9c in horizontal section and in FIG. 9d in vertical section. To the base body 944 (934) including the curved tunnel member 924 there are attached flexible lateral parts 943 (933), which, together with the flexible lamina-like ribs 931, 941, 932, 942 hold the buckling cover 935, 945, 95 in a taut condition. By arranging these ribs in the direction of the tangent of the lower edge of the base body 944, there are obtained favorable angles with respect to the cover which makes possible an easy sliding of the ribs, and, at the same time, permit the use of an uncomplicated mold for its manufacture. The swept-back cover form 946 affords protection from an impact against the adjusting post. It is expedient to reinforce the lower laminae by supporting ribs 947. Similarly, the laminae may be once or several times interrupted along their width as indicated at 931. As indicated at 948, the intermediate spaces between the laminae may be filled with foam material.

The effect of the buckling cover 935 in cooperation with the flexible lateral parts 933 and the laminae 931 is illustrated in FIG. 9c. The right-hand half of the figure illustrates the buckling cover before deformation, while the left-hand half shows the buckling cover in an impact-caused deformed condition. The left-hand half of FIG. 9c shows the buckling of the cover 935 under the effect of the momentum of the occupant's head. There also results bending deformation of the lateral part 933 and the laminae 932. There is also shown the deformation under the effect of an arbitrarily chosen direction 939 of an impact from the rear. For clarity, the cushioning and upholstery of the head portion are shown only partially at 930.

In FIG. 1a the head portion 9 is shown only schematically; the lamina-like ribs are omitted and the buckling cover 95 is shown only in broken lines. The arrow 99 indicates the direction of deformation of the buckling cover 95. The arrows 86, 806 indicate the direction of deformation of the torsion member 85, 805, 815 for the pivotal adjusting means 81, 801. The arrow 87 indicates the possible directions of adjustment for the headrest cushion.

The aforeoutlined characteristics also apply to the headrest assembly 9 illustrated in FIG. 1b, in which, however, the pivotal adjusting device 801 is, with its torsion member 805, arranged within the headrest cushion and the radial or height adjustment is effected by means of one or more height adjusting post or posts 91 inserted into the backup support (311) for the backrest cushion.

Figure 2E:
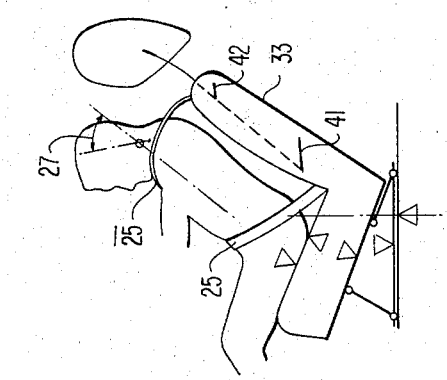
FIG. 2e is a schematic side elevational view of the vehicle seat with an occupant showing the final position thereof following a front-end collision.
Figure 2D:
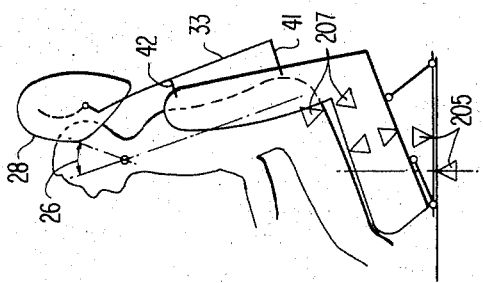
FIGS. 2a, 2b, 2c and 2d are schematic side elevational views of the vehicle seat with an occupant showing in sequence the course of displacement of the vehicle seat in the case of a rear-end collision.
Figure 2C:
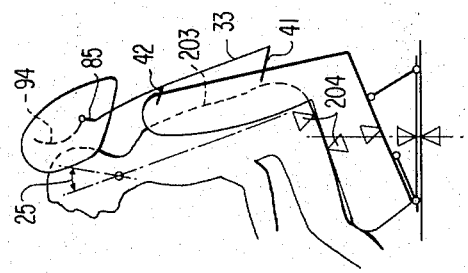
Figure 2B:
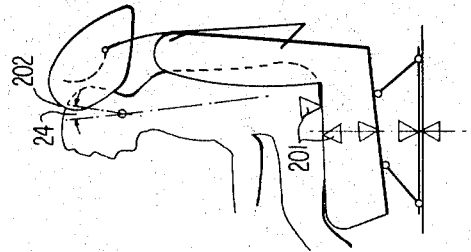
Figure 2A:
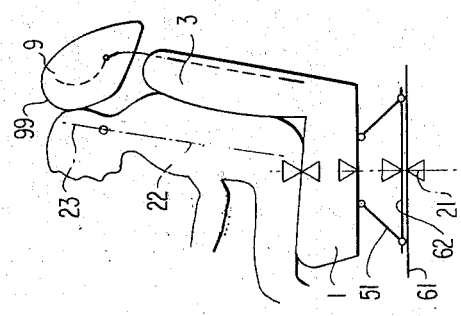

The course of motion of the predetermined displacement executed by the safety seat according to the invention in case of a rearward impact is illustrated in FIGS. 2a–2d and its final position in case of a frontal impact is illustrated in FIG. 2e. The triangular symbols 21 201, 204, 205 and 207 clearly indicate the body shifts; there is also shown the torso axis 22 together with the head (vertebral column) axis 23 and the respective nutation angles 24, 25, 26 and 27 of the occupant's head 202. The rear upholstery of the backrest is omitted in these figures to better show the shift of the backup support 33 for the backrest cushion with its deforming members 41 and 42. The guide rails 61 and the sliding rails 62 of the seat 1, together with the torsion levers 51 forming the carrier frame for the seat are shown schematically. Starting from the position of rest in FIG. 2a, the FIG. 2b shows the first phase in which, by virtue of the momentum of the legs, first the lower torsion members 41 are deflected. As a result, the headrest assembly 9, together with the buckling cover 99, swings forward. Although in this phase the occupant's head 202 remains substantially in the initial position of rest, by virtue of the displacement of his torso there already appears a small nutation angle 24. FIG. 2c shows a middle phase in which the carrier frame 51 for the seat assembly 1 is already entirely deformed, while the deforming members 41, 42 for the backup support 33 of the backrest cushion are substantially deformed. The torsion member 85 at the pivotal adjusting means of the headrest assembly already shows a significant deformation resulting in an increased nutation angle 25. FIG. 2d shows the final position of all deformable elements according to the invention. In FIG. 2d the occupant is shown at 207 as being only slightly lifted off the vehicle seat. It is seen that there is a significant unused capacity 28 for accommodating the occupant's head in case of a more significant lift of his body. In FIGS. 2a–2d the advantages of the arcuate shape of the carrier structure 94 for the headrest assembly may also be observed.

In FIG. 2e there is shown the shift of the occupant's body in case of a front-end collision when non-expandable seat belts 25, $\overline{25}$ are used which are secured to the backup support 33 for the backrest cushion. Dependent upon the real expansion of the seat belts determined by their type, the extent of the body shift varies.

Figure 2F:
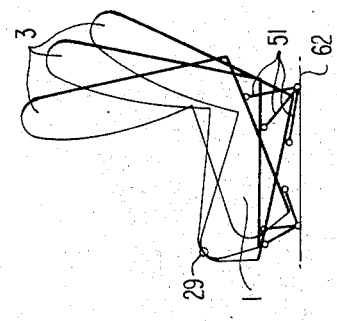
FIG. 2f is a schematic side elevational view of the seat carrier frame and its displacement in case of small leg space.

FIG. 2f illustrates how, according to the invention, the predetermined shift may be adapted to the space assigned to the co-passenger. By appropriate positioning of the torsion members 51 forming the carrier frame for the seat 1, only a minimum shift of the knees will occur in case of a frontal impact in vehicles with small leg space as indicated at 21.

What is claimed is:

1. In a vehicle safety seat of the known type having (a) stationary means affixed to the vehicle floor, (b) a seat portion, (c) a length adjusting means including a detent structure to immobilize said seat portion with respect to said stationary means in any preselected position, (d) a seat carrier frame connecting said length adjusting means with said seat portion, (e) a backrest portion secured to said seat portion and including a backrest frame and a backrest cushion, (f) a headrest secured to said backrest portion, said headrest including a headrest cushion, (g) a height and inclination adjusting means associated with said headrest and including detent means to immobilize said headrest in any selected angular and height position, the improvement including the combination of A. deformable detent elements forming part of said detent structure associated with said length adjusting means, said detent elements deforming in the direction of length adjustment of said seat upon an accident-caused impact, B. a trapezoidal torsion bar assembly constituting said seat carrier frame and deforming upon an accident-caused impact, C. a rigid backup means for supporting said backrest cushion, D. deformable connecting elements attaching said backup means to said backrest frame, said deformable connecting elements deforming upon an accident-caused impact, E. a torsion member forming part of said inclination adjusting means for said headrest, said torsion member deforming upon an accident-caused impact, F. a carrier structure forming part of said headrest and including deformable support members and G. a buckling cover forming part of said headrest and being mounted on said last-named carrier structure, said combination constituting an energy-dissipating system displaceable to a limited extent under the inertia effect of an occupant's body upon accident-caused impacts, said system resulting in a predetermined, impact-caused displacement of the occupant's head and body by means of an overlapping, but timely staggered shift of said seat portion, engagement of the occupant's head by said headrest, limited shift of the occupant's back, tilting of the occupant's body, limited nutation of the occupant's head and limited displacement of the entire seat achieving a limited acceleration course for the duration of the impact.

2. An improvement as defined in claim 1, wherein said deformable connecting elements have a direction of deformation that extends rearwardly from said backrest frame.

3. An improvement as defined in claim 1, wherein said deformable connecting elements have a direction of deformation that extends rearwardly and upwardly from said backrest frame.

4. An improvement as defined in claim 1, including sliding rails forming part of said length adjusting means and gliding with said seat portion as a unit on said stationary means during length adjustments, said trapezoidal torsion bar assembly being affixed to said sliding rails and to said seat portion.

5. An improvement as defined in claim 4, said trapezoidal torsion bar assembly being formed as continuous tubular bars having deformable portions.

6. An improvement as defined in claim 4, said trapezoidal torsion bar assembly including a lever having transversely inserted torsionally deforming elements.

7. An improvement as defined in claim 6, including torsion limiting ring means inserted on at least one of said transversally inserted torsionally deforming elements.

8. An improvement as defined in claim 1, wherein said stationary means is formed of a pair of fixedly attached guide rails including means for receiving said deformable detent elements.

9. An improvement as defined in claim 8, wherein said last-named deformable detent elements are formed of compressible members plastically deforming beyond their flow limit.

10. An improvement as defined in claim 1, said carrier structure of said headrest including rib-like reinforcing laminae extending parallel to the tangent of the lower edge of said carrier structure, said carrier structure being convexly arcuate towards the occupant's head and said buckling cover having at its lower portion a substantially swept-back shape.

11. An improvement as defined in claim 1, said height adjusting means associated with said headrest including at least one height adjusting post connected to said backrest and to said headrest, said height adjusting post being convexly arcuate towards the occupant's head and being engaged by said detent means to immobilize said headrest in any selected height position.

12. An improvement as defined in claim 1, including at least one electric contact bridging at least one of the deformable components, said electric contact being ruptured by the deformation of the associated component.

* * * * *